US012637384B2

(12) United States Patent
Dawes et al.

(10) Patent No.: US 12,637,384 B2
(45) Date of Patent: May 26, 2026

(54) METHOD FOR MAKING HALOGEN DOPED OPTICAL ELEMENT

(71) Applicant: CORNING INCORPORATED, Corning, NY (US)

(72) Inventors: Steven Bruce Dawes, Corning, NY (US); Douglas Hull Jennings, Corning, NY (US); Pushkar Tandon, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/377,484

(22) Filed: Oct. 6, 2023

(65) Prior Publication Data

US 2024/0034667 A1 Feb. 1, 2024

Related U.S. Application Data

(63) Continuation of application No. 15/529,583, filed as application No. PCT/US2015/062472 on Nov. 24, 2015, now abandoned.

(Continued)

(51) Int. Cl.
*C03B 19/14* (2006.01)
*C03B 19/06* (2006.01)
(Continued)

(52) U.S. Cl.
CPC .............. *C03C 3/06* (2013.01); *C03B 19/066* (2013.01); *C03B 19/1453* (2013.01);
(Continued)

(58) Field of Classification Search
None
See application file for complete search history.

(56) References Cited

U.S. PATENT DOCUMENTS 2,326,059 A 8/1943 Nordberg
3,690,855 A 9/1972 Schultz
(Continued)

FOREIGN PATENT DOCUMENTS

DE 102013101328 B3 2/2014
EP 2371773 A1 10/2011
(Continued)

OTHER PUBLICATIONS

European Patent Application No. 21157711.9, Extended European Search Report dated Jun. 14, 2021; 10 pages; European Patent Office.

(Continued)

*Primary Examiner* — Lisa L Herring
(74) *Attorney, Agent, or Firm* — Amy T. Lang

(57) ABSTRACT

A method of forming an optical element is provided. The method includes producing silica-based soot particles using chemical vapor deposition, the silica-based soot particles having an average particle size of between about 0.05 μm and about 0.25 μm. The method also includes forming a soot compact from the silica-based soot particles and doping the soot compact with a halogen in a closed system by contacting the silica-based soot compact with a halogen-containing gas in the closed system at a temperature of less than about 1200° C.

11 Claims, 5 Drawing Sheets

Related U.S. Application Data

(60) Provisional application No. 62/084,846, filed on Nov. 26, 2014.

(51) Int. Cl.

| | |
|---|---|
| *C03B 25/02* | (2006.01) |
| *C03B 37/012* | (2006.01) |
| *C03B 37/014* | (2006.01) |
| *C03B 37/018* | (2006.01) |
| *C03C 3/06* | (2006.01) |
| *G02B 6/036* | (2006.01) |

(52) U.S. Cl.

CPC .......... *C03B 19/1461* (2013.01); *C03B 25/02* (2013.01); *C03B 37/01282* (2013.01); *C03B 37/014* (2013.01); *C03B 37/01446* (2013.01); *C03B 37/01453* (2013.01); *C03B 37/01853* (2013.01); *G02B 6/036* (2013.01); *C03B 2201/075* (2013.01); *C03B 2201/12* (2013.01); *C03B 2201/20* (2013.01); *C03B 2201/42* (2013.01)

(56) References Cited

U.S. PATENT DOCUMENTS

| | | |
|---|---|---|
| 3,785,722 A | 1/1974 | Schultz |
| 4,789,389 A | 12/1988 | Schermerhorn et al. |
| 4,938,788 A | 7/1990 | Segawa et al. |
| 4,969,941 A | 11/1990 | Kyoto et al. |
| 4,981,503 A | 1/1991 | Segawa et al. |
| 5,016,265 A | 5/1991 | Hoover |
| 5,043,002 A | 8/1991 | Dobbins et al. |
| 5,053,068 A | 10/1991 | Kyoto et al. |
| 5,063,003 A | 11/1991 | Gonzalez-Oliver |
| 5,152,819 A | 10/1992 | Blackwell et al. |
| 5,154,744 A | 10/1992 | Blackwell et al. |
| 5,157,744 A | 10/1992 | Korotky |
| 5,200,173 A | 4/1993 | Kamen et al. |
| 5,244,485 A | 9/1993 | Hihara et al. |
| 5,267,343 A | 11/1993 | Lyons et al. |
| 5,328,784 A | 7/1994 | Fukuda |
| 5,470,369 A | 11/1995 | Tsuchiya et al. |
| 5,510,230 A | 4/1996 | Tennant et al. |
| 5,521,031 A | 5/1996 | Tennant et al. |
| 5,574,820 A | 11/1996 | Griscom |
| 5,696,038 A | 12/1997 | Maxon |
| 5,698,484 A | 12/1997 | Maxon |
| 5,951,730 A | 9/1999 | Schermerhorn |
| 5,956,192 A | 9/1999 | Williamson |
| 5,970,751 A | 10/1999 | Maxon et al. |
| 5,989,776 A | 11/1999 | Felter et al. |
| 6,013,399 A | 1/2000 | Nguyen |
| 6,048,652 A | 4/2000 | Nguyen et al. |
| 6,118,577 A | 9/2000 | Sweatt et al. |
| 6,133,577 A | 10/2000 | Gutowski et al. |
| 6,189,340 B1 | 2/2001 | Burke et al. |
| 6,368,942 B1 | 4/2002 | Cardinale |
| 6,705,125 B2 | 3/2004 | Peterson et al. |
| 6,764,619 B2 | 7/2004 | Bernas et al. |
| 6,920,765 B2 | 7/2005 | Menapace et al. |
| 6,931,097 B1 | 8/2005 | Davis et al. |
| 6,997,015 B2 | 2/2006 | Bowden et al. |
| 7,155,936 B2 | 1/2007 | Dawes et al. |
| 7,172,983 B2 | 2/2007 | Alkemper et al. |
| RE40,586 E | 11/2008 | Hrdina et al. |
| 8,037,717 B2 | 10/2011 | Dawes et al. |
| 8,468,852 B2 | 6/2013 | Dawes et al. |
| 8,578,736 B2 | 11/2013 | Dawes et al. |
| 8,735,308 B2 | 5/2014 | Koike et al. |
| 2002/0043080 A1 | 4/2002 | Best et al. |
| 2002/0059810 A1 | 5/2002 | Borrelli et al. |
| 2003/0079502 A1 | 5/2003 | Dawes et al. |
| 2003/0159466 A1 | 8/2003 | Bowden et al. |
| 2003/0221459 A1 | 12/2003 | Walczak |
| 2004/0027555 A1 | 2/2004 | Hrdina et al. |
| 2004/0045318 A1 | 3/2004 | Hrdina et al. |
| 2004/0121451 A1 | 6/2004 | Moritz et al. |
| 2005/0032622 A1 | 2/2005 | Dawes et al. |
| 2005/0245382 A1 | 11/2005 | Iwahashi et al. |
| 2005/0245383 A1 | 11/2005 | Iwahashi et al. |
| 2005/0272590 A1 | 12/2005 | Iwahashi et al. |
| 2006/0130529 A1 | 6/2006 | Bookbinder et al. |
| 2006/0179879 A1 | 8/2006 | Ellison et al. |
| 2007/0137252 A1 | 6/2007 | Maxon et al. |
| 2008/0117512 A1 | 5/2008 | Yamamoto et al. |
| 2009/0104454 A1 | 4/2009 | Sayce |
| 2009/0143213 A1 | 6/2009 | Hrdina et al. |
| 2010/0071421 A1 | 3/2010 | Dawes et al. |
| 2010/0107700 A1 | 5/2010 | Dawes et al. |
| 2010/0310219 A1 | 12/2010 | Bookbinder et al. |
| 2010/0323873 A1 | 12/2010 | Koike et al. |
| 2011/0043787 A1 | 2/2011 | Duran |
| 2011/0048075 A1 | 3/2011 | Duran et al. |
| 2011/0132038 A1 | 6/2011 | Dawes et al. |
| 2011/0239706 A1 | 10/2011 | Tamitsuji et al. |
| 2011/0267685 A1 | 11/2011 | Schreiber et al. |
| 2012/0026473 A1 | 2/2012 | Genier |
| 2012/0212721 A1 | 8/2012 | Clauss et al. |
| 2012/0327384 A1 | 12/2012 | Clauss |
| 2013/0047669 A1 | 2/2013 | Annamalai |
| 2013/0136876 A1 | 5/2013 | Dawes et al. |
| 2014/0060118 A1 | 3/2014 | Dawes et al. |
| 2014/0155246 A1 | 6/2014 | Annamalai et al. |
| 2015/0376049 A1 | 12/2015 | Thomas et al. |
| 2016/0011365 A1 | 1/2016 | Berkey et al. |
| 2016/0085145 A1* | 3/2016 | Ochs .................. C03B 19/1453 65/17.5 |

FOREIGN PATENT DOCUMENTS

| | | |
|---|---|---|
| EP | 2377826 A1 | 10/2011 |
| JP | 64-076927 A | 3/1989 |
| JP | 04-002625 A | 1/1992 |
| JP | 05-345628 A | 12/1993 |
| JP | 07-053225 A | 2/1995 |
| JP | 07-300325 A | 11/1995 |
| JP | 2004-131373 A | 4/2004 |
| JP | 2011-225438 A | 11/2011 |
| WO | 2001/007967 A1 | 2/2001 |
| WO | 2001/008163 A1 | 2/2001 |
| WO | 03/37811 A1 | 5/2003 |
| WO | 2010/082586 A1 | 7/2010 |

OTHER PUBLICATIONS

Euvllc, "EUV Lithography NGL Technology Review." 96 Pages, Jun. 9, 1999.

Gwyn, C. et al., "Extreme Ultraviolet Lithography." Journal of Vacuum Science & Technology B: Microelectronics and Nanometer Structures Processing, Measurement, and Phenomena, vol. 16, Issue 6, 15 Pages, Dec. 1998.

Gwyn, C., "Extreme Ultraviolet Lithography: a White Paper." EUV LLC, pp. 97-141, 1999.

Hagy, H. et al., "Determining Absolute Thermal Expansion of Titania-Silica Glasses: A Refined Ultrasonic Method." Applied Optics, vol. 14, No. 9, pp. 2099-2103, Sep. 1975.

International Search Report and Written Opinion of the International Searching Authority; PCT/US2015/062472; Mailed Feb. 2, 2016; 12 Pages; European Patent Office.

Jewell, T., "Four-Mirror Ring-Field System for EUV Projection Lithography." OSA Proceedings on Extreme Ultraviolet Lithography, vol. 23, pp. 98-102, 1994.

Machine Translation of Office Action Mailed Nov. 6, 2019 in Corresponding Japanese Patent Application No. 2017527892; Japan Patent Office; 5 Pgs.

Mazurin, O. et al., "Crystallization of Silica and Titanium Oxide-Silica Corning Glasses (Codes 7940 and 7971)." Journal of Non-Crystalline Solids, vol. 18, pp. 1-9, 1975.

Rajaram, M., et al., "Radiation-Induced Surface Deformation in Low-Thermal-Expansion Glasses and Glass-Ceramics." Advanced Ceramic Materials, vol. 3, No. 6, pp. 598-600, 1988.

(56)　　　　　　　　References Cited

OTHER PUBLICATIONS

Schultz, P. et al., "Ultra-Low-Expansion Glasses and Their Structure in the Sl02-Tl02 System." Amorphous Materials, pp. 453-461, Sep. 1970.

Schultz, P., "Binary Titania-Silica Glasses Containing 10 to 20 WT% TiO2." Journal of the American Ceramic Society, vol. 59, No. 5-6, pp. 214-219, May 1976.

Stulen, R. et al., "Extreme Ultraviolet Lithography." IEEE Journal of Quantum Electronics, vol. 35, No. 5, pp. 694-699, May 1999.

Tong, W. et al., "Substrates Requirements for Extreme Ultraviolet Lithography." 19th Annual Symposium on Photomasktechnology, 8 Pages, Dec. 30, 1999.

* cited by examiner

METHOD FOR MAKING HALOGEN DOPED OPTICAL ELEMENT

This application is a continuation of and claims the benefit of priority of U.S. patent application Ser. No. 15/529,583, filed May 25, 2017, which claims the benefit of priority of a national stage application under 35 U.S.C. § 371 of International Application No. PCT/US2015/062472, filed on Nov. 24, 2015, which claims the benefit of priority to U.S. Provisional Application No. 62/084,846 filed on Nov. 26, 2014, the contents of which are incorporated herein by reference in their entirety.

FIELD

The present disclosure relates generally to optical elements, and in particular, to methods for forming optical elements from doped silica glass articles.

BACKGROUND

Optics, particularly reflective optics, are an important part of elements employed in Extreme Ultra-Violet (EUV) lithography. These elements are used with extreme ultraviolet radiation to illuminate, project, and reduce pattern images that are utilized to form integrated circuit patterns. The use of extreme ultraviolet radiation is beneficial in that smaller integrated circuit features can be achieved; however, the manipulation of the radiation in this wavelength range raises challenges.

In these and similar applications, low thermal expansion glass, such as silica-titania glass, is currently being used for making projection optics. In contrast to other materials, low thermal expansion glass provides improved polishability, improved coefficient of thermal expansion (CTE) control, and improved dimensional stability. However, as the development of these and similar applications advances, the demand for improved material characteristics grows.

Ultra-low expansion (ULE) glasses and EUV lithographic elements have traditionally been made by chemical vapor deposition (CVD) processes. In CVD processes, high purity precursors are injected into flames to form fine particles that are directed toward the surface of growing glass. In the process, the glass is formed in layer deposits. One limitation of ULE glass made in accordance with CVD processes is that the resulting glass contains striae. Striae are compositional non-uniformities which adversely affect optical transmission in elements made from the glass. Striae result from thermal variations in the flame during the formation of the fine particles, and are also a result of thermal variations of the growing glass as the fine particles are deposited. Striae result in alternating thin layers of different CTE and therefore alternating planes of compression and tension between the layers. Striae in ULE glass are evident in the direction parallel with the top and bottom of the glass.

In some cases, striae have been found to impact surface finish at an angstrom root mean square (rms) level in reflective optical elements, which can adversely affect the polishability of the glass. Polishing glass having striae results in unequal material removal and unacceptable surface roughness which can present problems for stringent applications like EUV lithography elements. For example, it may create a mid-frequency surface structure that may cause image degradation in mirrors used in the projection systems for EUV lithography. While attempts have been made to modify and control aspects of the CVD processes to reduce striae, the fact that the method forms ULE glass in layer deposits at least partially contributes to the formation of striae.

Conventional optical fibers typically have a silica-based glass core region surrounded by a silica-based glass cladding. Some optical fibers include a core region that is doped with a dopant, such as $GeO_2$, suitable for raising the refractive index of the core region. Other optical fibers include a pure silica core region and at least one cladding region that is doped with a dopant, such as fluorine, suitable for lowering the refractive index of the doped cladding. The index difference between the core and the doped cladding is necessary to create a light guide wherein propagating light is generally confined to the core region. However, the optical loss, or attenuation, of the optical fiber having Ge-doped glass in the core region is higher than the attenuation expected in pure silica glass, and doping the cladding region affects the viscosity of the cladding glass. A viscosity mismatch between the core and cladding regions results in the region of the optical fiber having the higher viscosity bearing more tension during the process in which an optical fiber is drawn from an optical fiber preform. The resulting stress may be retained within the optical fiber as residual stress which may become "frozen" in the fiber upon cooling from the draw temperature and may contribute to increased attenuation of the resulting optical fiber.

Improved material characteristics and/or performance of these optical elements may be achieved by forming the optical elements from silica-based glass articles that include dopants different from, or in addition to, conventional dopants. However, limitations on doping efficiency and doping levels with these different, or additional, dopants make it difficult to achieve such improved material characteristics and/or performance.

SUMMARY

According to an embodiment of the present disclosure, a method of forming an optical element is provided. The method includes producing silica-based soot particles using chemical vapor deposition, the silica-based soot particles having an average particle size of between about 0.05 μm and about 0.25 μm. The method also includes forming a soot compact from the silica-based soot particles and doping the soot compact with a halogen in a closed system by contacting the silica-based soot compact with a halogen-containing gas in the closed system at a temperature of less than about 1200° C.

According to another embodiment of the present disclosure, a method of forming an optical element is provided. The method includes producing silica-based soot particles comprising silica and titania using chemical vapor deposition, the silica-based soot particles having an average particle size of between about 0.05 μm and about 0.25 μm. The method also includes forming a soot compact from the silica-based soot particles and doping the soot compact with a halogen in a closed system by contacting the silica-based soot compact with a halogen-containing gas in the closed system at a temperature of less than about 1200° C. The method further includes consolidating the soot compact in the closed system to form a glass article by simultaneously increasing the temperature in the closed system and decreasing the concentration of the halogen-containing gas in the closed system.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Figure 1:
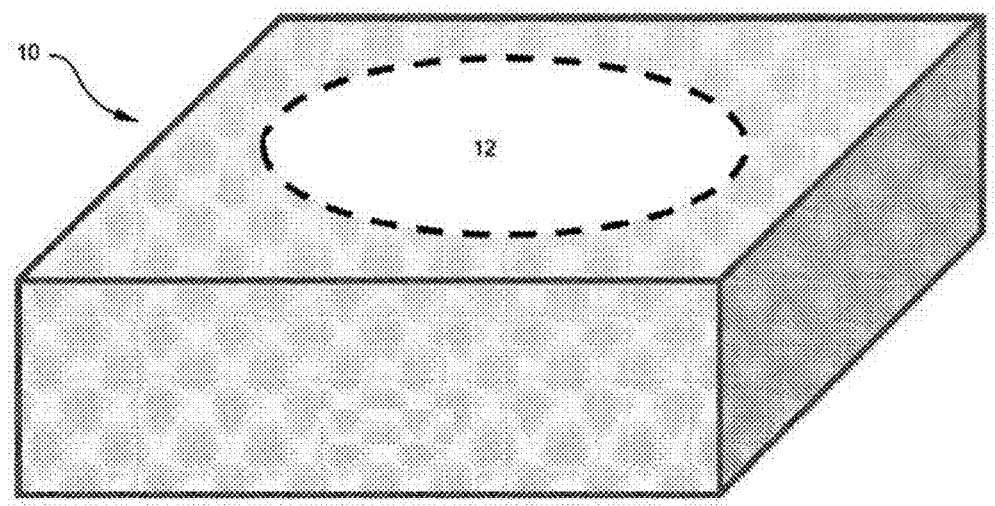
FIG. 1 is a top view illustrating a mold assembly in accordance with embodiments of the present disclosure.

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments.

Optical elements and methods of forming such optical elements are provided herein. As used herein, the terms "optic" and "optical element" denote a transparent glass article that can be formed into a reflective or transmissive element that is intended to be used to reflect, transmit or guide light. The methods described herein facilitate forming large and uniform glass optical elements. The methods also provide for efficient use of dopant material during the formation of the optical elements.

The methods facilitate forming optical elements capable of use in photolithography that are large, uniform and highly polishable. Such elements may have a near-zero thermal expansion over a wide operational temperature range, such as between about 20° C. and about and may have a slope of CTE versus temperature at 20° C. of less than about 1.0 ppb/K$^2$. A material that has near-zero thermal expansion is one that undergoes little or no dimensional change in response to changing temperature. As compared to optical elements capable of use in photolithography formed using a CVD process, elements made in accordance with the methods disclosed herein include lower variations in titania and halogen composition compared to the local average titania and halogen levels.

The methods described herein also facilitate forming optical elements capable of use as optical fibers. Such elements include a silica-based glass core region which may have a chlorine content of greater than about 1.5 wt. %. The core region is surrounded by at least one silica-based glass cladding region which may include pure silica or which may include silica doped with a dopant, such as fluorine, suitable for lowering the refractive index of the cladding. Where the optical fiber includes more than one cladding region, at least one of the cladding regions may include silica doped with a dopant such as fluorine. As compared to optical fibers which include a core region that is doped with GeO$_2$, the optical fibers described herein have a lower attenuation.

The method may include producing silica-based soot particles. Silica-based soot particles as described herein may be a by-product of high purity fused silica glass making processes which may include, but are not limited to, conventional CVD processes for making optical fiber preforms, such as outside vapor deposition (OVD) and vapor axial deposition (VAD) processes. Silica-based soot particles may also be collected from silica soot generation systems in which the silica-based soot particles are collected in a loose state. By "loose state" it is meant that the particles are not contacted with a collecting surface prior to being cooled and are not contacted with a collecting surface prior to substantially all of the precursor material being consumed by the flame. The silica-based soot particles may have an average particle size of between about 0.05 μm and about 0.25 μm. The particulate surface area of the silica-based soot particles may be greater than about 10 m$^2$/g, or greater than about 15 m$^2$/g, or greater than about 20 m$^2$/g, or greater than about 50 m$^2$/g, or even greater than about 100 m$^2$/g.

In addition to silica, the silica-based soot particles may include between about 1.0 wt. % and about 14 wt. % titania, or between about 5.0 wt. % and about 10 wt. %. titania. The silica-based soot particles may include about 8.0 wt. % titania. The silica-based soot particles may also include between about 1.0 wt. % and about 10 wt. % of one or more additives, or between about 1.0 wt. % and about 6.0 wt. % of one or more additives. The one or more additives may include, but are not limited to, boron containing compounds, fluorine containing compounds, chlorine containing compounds, phosphorous containing compounds and mixtures thereof. Where titania is included, the silica-based soot particles may have a binary composition of silica and titania or may have a ternary composition of silica, titania and an additive. The silica-based soot particles may also have a composition of silica, titania and a plurality of additives.

The method may also include forming a soot compact by pressing silica-based soot particles to form the soot compact. As is shown in FIG. 1, a mold assembly 10 having a mold cavity 12 may be filled with the silica-based soot particles. The mold cavity 12 may be of any shape, such as, but not limited to, round or elliptical, and may be selected based on a predetermined shape of the soot compact. The mold assembly 10 may have the same shape as the mold cavity 12.

Alternatively, the mold assembly 10 may have a different shape than the mold cavity 12. For example, if the mold cavity 12 has an elliptical shape, the mold assembly 10 may also have an elliptical shape. Or, as shown in FIG. 1, the mold assembly 10 may instead be rectangular. The mold cavity 12 may be filled with the silica-based soot particles. The design of the mold assembly 10 should be suitable to resist deformation in response to pressure exerted by the silica-based soot particles as the particles are pressed to form a soot compact. Embodiments of the present disclosure facilitate formation of large soot compacts, from which large optical elements, such as those used in EUV lithography, may be formed or from which large optical fiber preforms may be formed.

A pressing mechanism (not shown), such as a hydraulic press, may have a pressing plate that may be brought into contact with the silica-based soot particles in the mold cavity 12. The pressing plate may be shaped to enter the mold cavity 12 to press the silica-based soot particles without contacting the walls of the mold cavity 12. To prevent contact with the walls of the mold cavity 12, the pressing plate may be sized such that a gap exists between the outside edge of the pressing plate and the walls of the mold cavity 12. For example, where both the mold cavity 12 and the pressing plate are elliptical in shape, a gap between the walls of the mold cavity 12 and the pressing plate may exist around the entire circumference of the pressing plate. The gap may be approximately equal at all points around the outside edge of the pressing plate, and may be less than about 0.10 inches, or between about 0.005 inches and about 0.10 inches, or even between about 0.005 inches and about 0.06 inches. In addition to preventing contact of the pressing plate with the walls of the mold cavity 12, the gap may also serve as a passage for the escape of gas while pressing the silica-based soot particles to form the soot compact.

Once in contact with the silica-based soot particles, the pressing plate may be moved at a rate of less than about 10 mm per second. For example, the pressing plate may be moved at a rate of between about 1.0 mm per second and about 10 mm per second, or between about 1.0 mm per second and about 5.0 mm per second, or at a rate of about 3.0 mm per second. The pressing mechanism may assert a pressure on the silica-based soot particles of less than about 1000 psi, or less that about 250 psi, or even less than about 200 psi. For example, the pressing mechanism may assert a pressure on the silica-based soot particles of between about 100 psi and about 1000 psi, or even between about 100 psi and about 500 psi. Pressure may be applied in an axial direction to form a disc shaped soot compact.

The mold cavity 12 may be of any volume, and may be large enough to form a soot compact having a mass of greater than about 20 kg, greater than about 30 kg, or even greater than about 120 kg or more. The volume of the mold cavity 12 may be determined based on the size of the soot compact and the size of the intended optical element. Depending on the predetermined size of the soot compact, the mold cavity 12 should be large enough to accommodate an unpressed volume of loose silica-based soot particles. For example, in some cases, the volume of the mold cavity 12 may be about three times to about six times the volume of the soot compact.

Alternatively, the mold assembly 10 may further include a subassembly detachably connected to the mold assembly 10 to provide additional volume to accommodate loose silica-based soot particles prior to pressing the silica-based soot particles to form the soot compact. The subassembly may include a cavity having a top opening and a bottom opening, the top and bottom openings having the same shape as the mold cavity 12. When attached to the mold assembly 10, the subassembly cavity may be aligned with the mold cavity 12 to extend the volume of the mold cavity 12. In such a design, the mold cavity 12 may have a volume approximately equal to the predetermined size of the soot compact, and the combination of the volume of the mold cavity 12 and the volume of the subassembly cavity may be about three times to about six times the volume of the soot compact.

The pressing mechanism may include an ultrasonic gauge used to determine the density of the soot compact. Once the soot compact is pressed to a predetermined density, as measured by the ultrasonic gauge, movement of the pressing plate may be stopped. The soot compact may be pressed to a density of between about 0.50 g/cc and about 1.20 g/cc, or between about 0.70 g/cc and about 1.10 g/cc, or even between about 0.80 g/cc and about 1.00 g/cc. Once the soot compact is pressed to a predetermined density, the pressing plate may then be released by moving the pressing plate out of contact with, and away from, the soot compact. Alternatively, the pressing plate may not be released and the soot compact may be maintained under pressure for a period long enough to allow the soot compact to relax into a compressed state. The period to allow the soot compact to relax into a compressed state may be, for example, greater than about 10 minutes, or between about 10 minutes and about 48 hours. The period to allow the soot compact to relax into a compressed state may be, for example, about 5.0 hours.

Pressing the silica-based soot particles to form the soot compact may not require the addition of heat and may be performed at room temperature. Also, pressing the silica-based soot particles to form the soot compact may not include intentionally adding a binder or liquid, such as water, to the silica soot particles.

Once the soot compact is formed, the soot compact may be removed from the mold cavity 12. The soot compact may be heated to a temperature above about 700° C. to induce a small amount of shrinkage of the soot compact, which may permit movement of the soot compact out of the mold cavity 12. Alternatively, the mold may be a segmented assembly, and removal of the soot compact may include disassembling the mold.

As an alternative to pressing silica-based soot particles to form a soot compact, the method may include forming a soot compact using any of flame combustion methods, flame oxidation methods, flame hydrolysis methods, OVD, IVD (inside vapor deposition), VAD, double crucible method, rod-in-tube procedures, cane-in-soot method, and doped deposited silica processes. In such methods, silica-based soot particles are produced by combusting a silica precursor in a flame and depositing the silica-based soot particles on a rotating bait rod. The silica precursors may be, for example, OMCTS (octamethylcyclotetrasiloxane) or $SiCl_4$.

Figure 6:
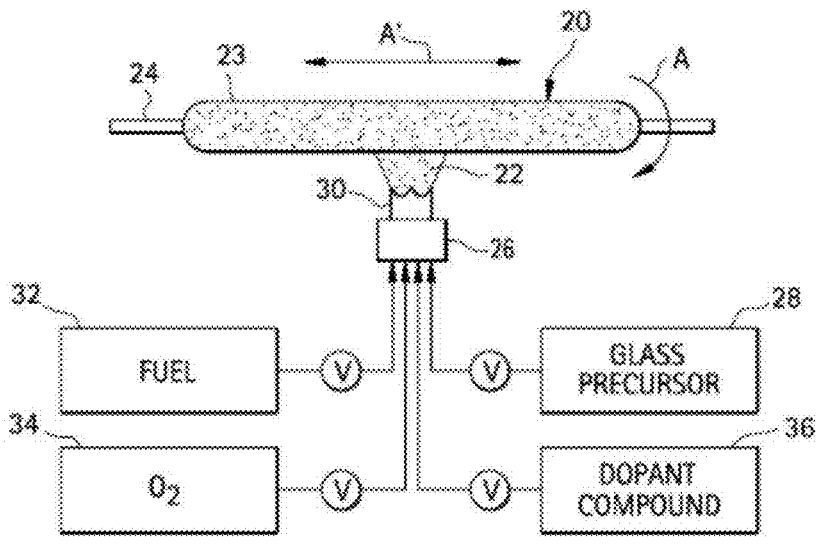
FIG. 6 is a schematic depiction of soot preform deposition via an OVD process.

By way of example and not intended to be limiting, formation of a soot preform according to an OVD method is illustrated in FIG. 6. As shown, soot preform 20 is formed by depositing silica-based soot particles 22 onto the outer surface of a rotating and translating bait rod 24. Bait rod 24 may be tapered. The silica-based soot particles 22 are formed by providing a glass/soot precursor 28 in gaseous form to a flame 30 of a burner 26 to oxidize the precursor 28. Fuel 32, such as methane ($CH_4$), and combustion supporting gas 34, such as oxygen, are provided to the burner 26 and ignited to form the flame 30. Mass flow controllers, labeled V, meter the appropriate amounts of glass/soot precursor 28, fuel 32 and combustion supporting gas 34, all preferably in gaseous form, to the burner 26. The glass/soot precursor 28 is a glass former compound and is oxidized in the flame 30 to form the generally cylindrically-shaped soot region 23, which may correspond to the core of an optical fiber preform.

The method may also include doping the soot compact which may include contacting the soot compact with a dopant containing gas. The dopant containing gas may include, but is not limited to, a halogen-containing gas such as a fluorine-containing gas, a chlorine-containing gas or a bromine-containing gas. The fluorine-containing gas may be, but is not limited to, $F_2$, $C_2F_6$, $CF_4$, $SF_6$ and $SiF_4$, and combinations thereof. The chlorine-containing gas may be, but is not limited to, $SiCl_4$, $Cl_2$ and $POCl_3$. The bromine-containing gas may be, but is not limited to, $SiBr_4$.

Figure 2:
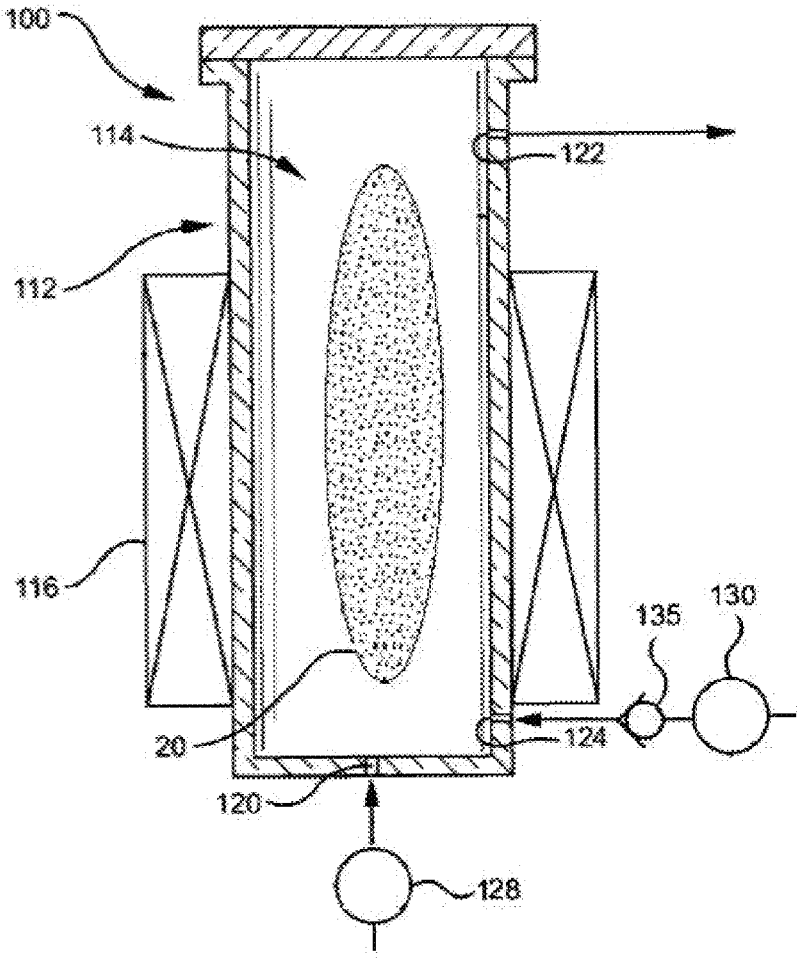
FIG. 2 is a schematic view of a closed system in accordance with embodiments of the present disclosure.

As shown in FIG. 2, the soot compact may be doped in a closed system 100. As used herein, the term "closed system" denotes a system which can enclose the entire soot compact and which limits gases within the closed system from flowing out of the system, and which limits ambient air from flowing into the system. The closed system 100 as shown in FIG. 2 is a sealed reaction chamber 112 having an interior 114 of the sealed reaction chamber 112. The sealed reaction chamber 112 may be, for example, a furnace in which later heat treatment of the soot compact may be performed. The temperature in the reaction chamber 112 during doping may be less than about 1200° C. For example, the temperature in the reaction chamber 112 during doping may be between about 300° C. and about 1200° C., or between about 850° C. and about 1100° C. Doping at a temperature of less than about 1200° C. is believed to promote uniform halogen doping of the soot compact, particularly in large soot compacts such as those used to form optical elements for EUV lithography and optical fiber preforms. A heating device 116 partially or fully surrounds a portion of the sealed reaction chamber 112. The heating device 116 may be, for example, an electrical coil that, in combination with a susceptor, forms an inductive heater. Alternatively, the heating device 116 may be an electrical resistance heater or any other suitable heating device that can provide sufficient heat to perform the method as described herein.

The closed system 100 may include a first gas source 128 in fluid connection with the reaction chamber 112 through a first inlet 120 from which a dopant containing gas may be introduced into the reaction chamber 112. The closed system may also include an outlet 122. A fluid control system may also be associated with the closed system 100 and may control the flow of gas in the closed system 100. The fluid control system may monitor the gas composition in the closed system 100 and maintain a predetermined dopant gas composition in the closed system 100. The predetermined dopant gas composition in the closed system 100 may be greater than about 90%, or greater than about 95%, or even greater than about 98% of the total gas composition of the closed system 100. Additionally, or in the alternative, the fluid control system may monitor the dopant gas partial pressure in the closed system 100, and maintain a predetermined dopant gas partial pressure in the closed system 100. The predetermined dopant gas partial pressure in the closed system 100 may be less than about 0.90 atm, or less than about atm. The predetermined dopant gas partial pressure in the closed system 100 may be between about 0.10 atm and about 0.50 atm.

The closed system 100 may include a second gas source 130 in fluid connection with the reaction chamber 112 through a second inlet 124. Between the second gas source 130 and the second inlet 124, a one-way valve 135 permits gas flow from the second gas source 130 into the reaction chamber 112. Maintaining a predetermined dopant gas composition, and/or maintaining a predetermined dopant gas partial pressure, may include bleeding dopant containing gas from the second gas source 130 into the reaction chamber 112. Without being limited by any particular theory, at least some amount of the dopant containing gas will be consumed in the closed system 100 as the dopant is absorbed by the soot compact 20. The fluid control system may measure the consumption of the dopant containing gas as a decrease in gas composition and/or as a decrease in partial pressure in the reaction chamber 112. In order to maintain the predetermined dopant gas composition, and/or the predetermined dopant gas partial pressure, the fluid control system may open the one-way valve 135 to permit dopant containing gas flow into the reaction chamber 112 until the predetermined dopant gas composition, and/or the predetermined dopant gas partial pressure is restored. Once the predetermined dopant gas composition, and/or the predetermined dopant gas partial pressure is restored, the fluid control system may close the one-way valve 135.

Doping the soot compact may also include pulling a vacuum on the closed system 100 prior to doping the soot compact and maintaining vacuum conditions while doping the soot compact. When under vacuum, total pressure in the reaction chamber 112 may be greater than about 0.50 atm. For example, the total pressure in the reaction chamber 112 may be between greater than about 0.25 atm, such as between about 0.25 atm and about 2.0 atm, or between about atm and about 5.0 atm, or between about 0.90 atm and 2.0 atm. According to embodiments of the present disclosure, total pressure in the reaction chamber 112 may be greater than 2.0 atm, such as between about 2.0 atm and about 30 atm. Generally, where the intent is to achieve uniform dopant content in the soot compact, doping the soot compact may be performed at lower pressures such as between about 0.25 atm and about 1.0 atm. However, where the intent is to achieve high dopant content or both high dopant content and uniform dopant content in the soot compact, doping the soot compact may be performed at higher pressures such as greater than about 0.90 atm.

Prior to doping the soot compact, the method may also include drying the soot compact. Drying the soot compact may include a plurality of drying cycles which include filling the reaction chamber 112 with a gas composition having less than about 50% of a drying gas, and evacuating the gas composition after a predetermined drying period. Alternatively, the gas composition may have less than about 10% of a drying gas, or even less than about 5.0% of a drying gas. The remainder of the gas composition may be helium. The predetermined drying period may be greater than about 10 minutes and may be, for example, between about 10 minutes and about 1.0 hour. The drying gas may be, but is not limited to, chlorine or chlorine containing gases and carbon monoxide. Drying the soot compact may prepare the soot compact for doping by removing moisture and hydroxyl groups from the soot compact, and also by removing transition metals or alkali metal components from the soot compact. When the drying cycles are complete, the reaction chamber 112 may be evacuated prior to introduction of a dopant containing gas into the reaction chamber 112.

The method may also include consolidating the doped soot compact to form a glass article. The doped soot compact may be heated to a sintering temperature between about 1200° C. and about 1650° C. and maintained at the sintering temperature until the soot compact is consolidated into a glass article. As explained above, the closed system 100 may be a furnace in which the doped soot compact may be consolidated, or the doped soot compact may be moved from the closed system 100 described above to a furnace where the doped soot compact may be consolidated.

Consolidating the doped soot compact to form a glass article may further include simultaneously increasing the temperature of the closed system 100 and decreasing the concentration of the dopant containing gas in the closed system 100. The concentration of dopant containing gas may be decreased with the increase of furnace temperature in accordance with the following relation:

$$y_{II} = y_{I,dop}\mathrm{Exp}\left[-21741\left(\left(\frac{1}{T_{I,dop}}\right)-\left(\frac{1}{T_{II}}\right)\right)\right] \quad (1)$$

wherein: $T_{I,dop}$ is the temperature in the closed system during doping of the soot compact with a halogen;

$T_{II}$ is the temperature in the closed system during consolidation of the soot compact;

$y_{I,dop}$ is the mole fraction of the halogen-containing gas in the closed system during doping of the soot compact with halogen; and $y_{II}$ is the maximum halogen-containing gas mole fraction in the closed system during consolidation of the soot compact at $T_{II}$.

The method may also include oxygenating the soot compact by contacting the soot compact with an oxygen-containing gas. The soot compact may be oxygenated at any time, including prior to or during drying of the soot compact, prior to or during doping of the soot compact, and prior to or during consolidation of the soot compact. Oxygenating the soot compact may be performed at a temperature of between about 1000° C. and about 1300° C. The soot compact may be oxygenated in an oxygen containing atmosphere with oxygen diffusing into the soot compact and reacting with trivalent titanium ($Ti^{3+}$) to lower oxidation states of titanium and to convert such titanium to tetravalent titanium ($Ti^{4+}$). Such oxygenating makes the consolidated glass article colorless and is believed to prevent the occurrence of a bluish-black discoloration of the consolidated glass article.

The method may also include annealing the glass article. Following consolidation, the reaction chamber 112 may be cooled to a holding temperature of between about 900° C. and about 1100° C. for a holding period of at least about 30 minutes, for example, between about 30 minutes and about 10 hours. After completion of the holding period, the reaction chamber 112 temperature may be decreased to a predetermined temperature, between about 700° C. and about 850° C., at a rate of less than about 10° C. per hour. For example, the rate may be between about per hour and about 10° C. per hour, or between about 0.10° C. per hour and about 5.0° C. per hour, or even between about 0.10° C. per hour and about 1.0° C. per hour. Once the predetermined temperature is reached, heat from the heat source may be removed, and the reaction chamber 112 may be allowed to cool to ambient temperature. After annealing, the fictive temperature of the glass article may be less than about 1100° C., or less than about 1000° C., or less than about 900° C., or even less than about 800° C.

The glass article may be annealed in the closed system 100, as described above, or the glass article may be moved from the closed system 100 and annealed in a separate vessel, such as a furnace. Similarly, where the doped soot compact is removed from the closed system 100 and consolidated in a separate furnace, the glass article may be annealed in the consolidation furnace, or may be moved from the consolidation furnace and annealed in a separate vessel, such as a separate furnace.

The method may also include processing the glass article to form optical elements. Once the glass article has been cooled to ambient temperature, the glass article may be cut, cored, reflowed into a target shape, or otherwise processed into shapes that are suitable for making optical elements. Such processing, in addition to cutting or coring, may include etching, additional thermal treatments, grinding, polishing, applying selected metals to form a mirror, reflowing, and such additional processing as may be necessary to form the desired optical element. According to embodiments of the present disclosure, additional silica-based soot may be deposited onto the glass article to form at least one optical fiber cladding region using the same method as explained above with respect to the core of an optical fiber preform. The at least one optical fiber cladding region may optionally be doped with a halogen using a halogen-containing dopant gas as described herein using the same doping steps as described herein, or using doping steps known in the art.

The optical elements capable of use in photolithography disclosed herein may be formed from a fluorine-doped silica-titania glass article. The doped glass article may include between about 0.50 wt. % and about 2.0 wt. % fluorine and the variation of fluorine concentration through the thickness of the doped glass article may be less than about 0.20 wt. %. The doped glass article may also include between about 1.0 wt. % and about 12 wt. % titania, or between about 5.0 wt. % and about 10 wt. % titania. The variation of titania concentration through the thickness of the doped glass article may be less than about 0.10 wt. %, and the doped glass article may be uniform and substantially free of striae. Such uniformity renders the doped glass article polishable, which in turn facilitates processing of the doped glass article to form the optical elements disclosed herein. The optical elements may have a near-zero thermal expansion over a wide operational temperature range, such as between about 20° C. and about 30° C., and may also have a slope of CTE versus temperature at 20° C. of less than about 1.0 ppb/$K^2$. The slope of CTE versus temperature at 20° C. may be less than about 0.80 ppb/$K^2$, or even less than about 0.60 ppb/$K^2$.

The optical elements disclosed herein may be photomask blanks or projection optic mirror substrates employed in EUV lithography. The doped glass article disclosed herein may also be used to form the critical zone of large mirrors used in EUV lithography. The doped glass article may be shaped and fusion bonded into a cavity formed in the critical zone in a larger undoped glass article.

Alternatively, the doped glass article disclosed herein may be a soot blank which may be used to form the core of an optical fiber preform, or may be an optical fiber preform that may be drawn into an optical fiber. The optical fiber may be formed from a chlorine-doped silica glass article as disclosed herein. Such optical fiber may have a core region having a chlorine content of greater than about 1.5 wt. %. For example, the core region of the optical fiber may have a chlorine content of between about 1.5 wt. % and about 4.75 wt. %, or between about 1.5 wt. % and about 4.5 wt. %, or between about 1.5 wt. % and about 4.0 wt. %, or between about 1.5 wt. % and about 3.0 wt. %. The core region of the optical fiber may have a chlorine content of between about 1.75 wt. % and about 4.5 wt. %, or between about 1.75 wt. % and about 4.0 wt. %, or greater than about 1.5 wt. %, or greater than about 1.75 wt. %, or greater than about 2.0 wt. %, or greater than about 2.25 wt. %.

11

Additionally, the optical fiber may be formed from a silica glass article doped with both chlorine and fluorine. In addition to a core region having a chlorine content such as described above, such optical fiber may have at least one cladding region having a fluorine content of between about 0.10 wt. % and about 0.50 wt. %. For example, the at least one cladding region may have a fluorine content of between about 0.15 wt. % and about 0.45 wt. %, or between about 0.20 wt. % and about 0.40 wt. %.

The optical fiber described herein may also be described using the relative refractive index of various regions of the optical fiber. As used herein the term "relative refractive index" or "relative refractive index percent" is defined as:

$$\Delta\% = 100 \times \left(n_i^2 - n_c^2\right)/2n_i^2$$

where $n_c$ is the refractive index of undoped silica and $n_i$ is the average refractive index at point i in the particular region of the optical fiber.

As further used herein, the relative refractive index is represented by $\Delta$ and its values are given in units of "%", unless otherwise specified. The terms $\Delta$, % $\Delta$, $\Delta\%$, delta index, percent index, percent delta index and % can be used interchangeably herein. In cases where the refractive index of a region is less than the refractive index of undoped silica, the relative index percent is negative and is referred to as having a depressed region or depressed index.

The optical fiber formed from the chlorine-doped silica glass article as disclosed herein may have a core region having a relative refractive index between about 0.08% and about 0.30%. For example, the core region may have a relative refractive index of between about 0.10% and about 0.25%, or between about 0.12% and about 0.20%, or even between about 0.14% and about 0.18%.

Additionally, the optical fiber formed from a silica glass article doped with both chlorine and fluorine may have at least one cladding region having a relative refractive index between about 0% and about 0.25%, or between about −0.05% and about −0.20%, or between about −0.10% and about −0.20%.

Methods described herein enable more efficient use of dopant containing gases, which in turn thus reduce the overall costs associated with forming doped glass articles as described herein. Conventional doping processes flow dopant containing gases over a soot blank in an open system. The utilization efficiency of such processes, defined as the amount (in wt. %) of the dopant provided in the dopant containing gas divided by the amount (in wt. %) of the dopant in the resulting doped glass article, is typically utilize only about 10-25%. In such processes, between about 75-90% of the dopant gas is discarded after the doping process is complete. In contrast, performing a doping process in closed systems according to embodiments of the present disclosure utilizes or conserves greater than about 90% of the dopant gas. The closed system eliminates the loss of dopant gas experienced during a doping process in an open system and also allows for the recovery of dopant gas once the doping process is complete.

EXAMPLES

Embodiments of the present disclosure are further described below with respect to certain exemplary and specific embodiments thereof, which are illustrative only and not intended to be limiting.

Example 1

Figure 3:
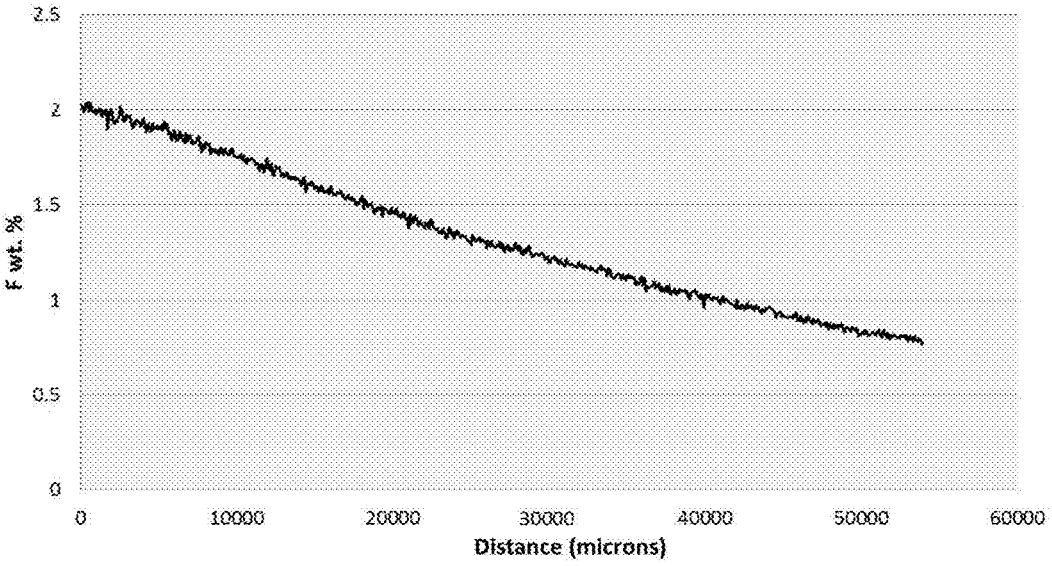
FIG. 3 is a graph depicting dopant concentration vs. distance from the outer surface of a glass article in accordance with embodiments of the present disclosure.

To produce a baseline dopant profile, a silica soot compact having a diameter of about 14 cm was heat treated in a furnace under a helium atmosphere. The soot compact was held isothermally at a temperature of about 1145° C. for a period of about 4.0 hours. For about 1.0 hour of the about 4.0 hour period, a gas flow having about 2.0% chlorine was flowed through the furnace to dry the soot compact of moisture and hydroxyl groups, and to remove any transition metal contaminants. While maintaining the furnace temperature at about 1145° C., a gas flow having about 50% silicon tetrafluoride (SiF₄) was then flowed through the furnace for a period of about 90 minutes to dope the soot compact with fluorine. Subsequently, the furnace temperature was increased from about 1145° C. to about 1345° C. over a period of about 1.0 hour under a gas flow of about 6.0% $SiF_4$, and held for about 30 minutes. The furnace temperature was then increased to about 1450° C. and the soot compact was sintered under a helium atmosphere to form a doped glass article. As illustrated in FIG. 3, the dopant profile of this example shows a monotonic decrease in fluorine content dropping from about 2.0% at the surface of the glass article to less than about 1.0% near the center of the glass article. The non-uniform dopant profile is believed to be a result of a progressively diffusion limited reaction. It is believed that the reaction of fluorine at 1145° C. is sufficient to increase the densification rate at the outer surface of the glass article, and thereby limit diffusivity of the dopant beyond the outer surface of the glass article.

Example 2

Figure 4:
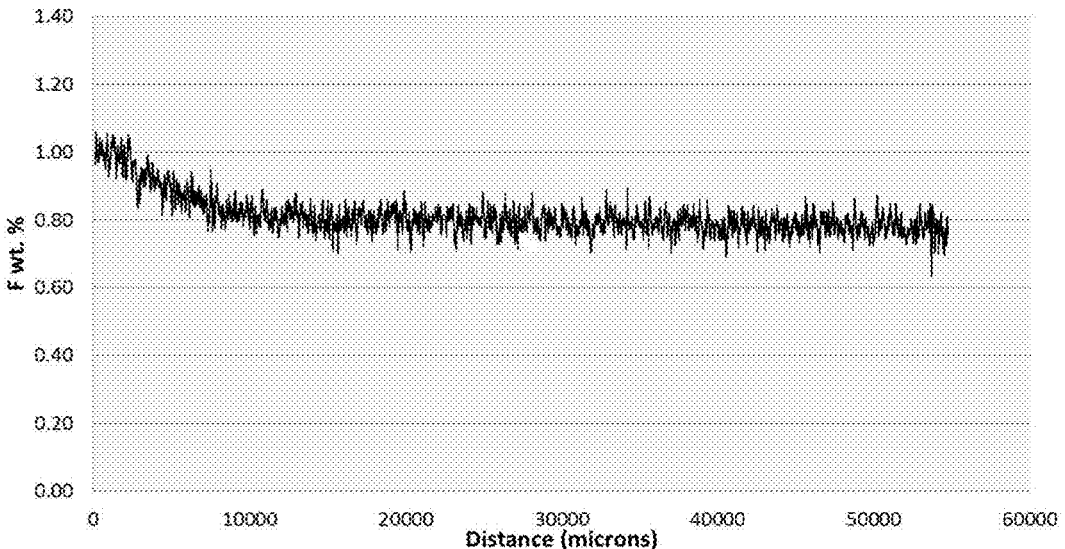
FIG. 4 is a graph depicting dopant concentration vs. distance from the outer surface of a glass article in accordance with embodiments of the present disclosure.

To test this belief, a soot compact having a diameter of about 14 cm was heat treated in a furnace under a helium atmosphere. The soot compact was held isothermally at a temperature of about 1060° C. for a period of about 4.0 hours. For about 1.0 hour of the about 4.0 hour period, a gas flow having about 9.0% chlorine was flowed through the furnace to dry the soot compact of moisture and hydroxyl groups, and to remove any transition metal contaminants. While maintaining the furnace temperature at about 1060° C., a gas flow having about 25% silicon tetrafluoride ($SiF_4$) was then flowed through the furnace for a period of about 2.0 hours to dope the soot compact with fluorine. Subsequently, the furnace temperature was increased from about 1060° C. to about 1300° C. over a period of about 30 minutes under a gas flow of about 2.0% $SiF_4$, and held for about 15 minutes. The soot compact was then sintered under a helium atmosphere at a temperature of about 1190° C. for about 12 hours to form a doped glass article. As illustrated in FIG. 4, the dopant profile of this example shows uniform fluorine content of about 0.80% from the center of the glass article to within about 7.0 mm from the outer surface of the glass article. At the outer surface of the glass article, the fluorine content rises to about 1.0%. It is believed that the lower temperatures of this example, as compared to Example 1, allowed for sufficient diffusivity of the dopant to improve the uniformity doped glass article.

Example 3

Figure 5:
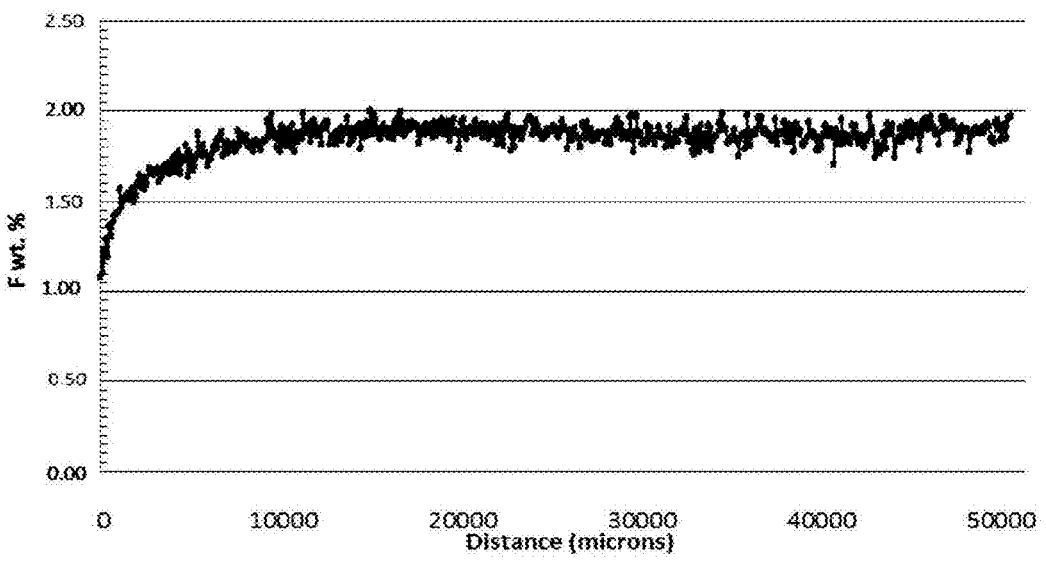
FIG. 5 is a graph depicting dopant concentration vs. distance from the outer surface of a glass article in accordance with embodiments of the present disclosure.

Attempts were made to better control the process of Example 2 and improve the uniformity of a doped glass article. A soot compact having a diameter of about 14 cm was heat treated in a closed system under a helium atmosphere. In this example, the closed system included a sealed furnace. The soot compact was held isothermally at a temperature of about 1060° C. for a period of about 4.0 hours. The system was filled with a gas having about 50% chlorine to dry the soot compact of moisture and hydroxyl groups, and to remove any transition metal contaminants. After about 20 minutes, the gas was evacuated from the system. Three cycles of filling for about 1.0 minute to about 2.0 minutes, holding for about 20 minutes, and evacuating for about 10 minutes were performed. Once the final cycle was completed, the system was evacuated for about 10 minutes. While maintaining the system temperature at about 1060° C., the system was filled with a gas having about 100% silicon tetrafluoride ($SiF_4$) and the system remained closed for about 2.0 hours to dope the soot compact. Subsequently, a vacuum was pulled on the closed system and the system temperature was increased from about 1060° C. to about 1350° C. over a period of about 30 minutes and the soot compact was held at about 1350° C. for about 60 minutes to sinter the soot compact and to form a doped glass article. As illustrated in FIG. 5, the dopant profile of this example shows uniform fluorine content of about 1.90% from the center of the glass article to within about 7.0 mm. At the outer surface of the glass article, the fluorine content decreases to about 1.10%. It is believed that the lower temperatures used in Example 2, coupled with the closed system of this example, allowed for sufficient diffusivity of the dopant to improve the uniformity doped glass article.

Example 4

A soot compact was doped with fluorine to show the relationship of doping pressure and doping temperature to the dopant content of the doped glass article. In the present example, a doping temperature of about 1100° C. and a doping pressure of about 25 kPa were selected to form a doped glass article having a fluorine content of about 1.5 wt. %.

A 140 gram soot compact was positioned in the center of a hot zone of a closed system. The closed system was a tube furnace formed form a 48 inch long and 3.5 inch diameter alumina tube that was fitted with sealed end caps and a valve on each end of the tube and which had a 24 inch hot zone. A vacuum pump was coupled to the valve on one end of the tube furnace and a source of $SiF_4$ was coupled to the valve on the other end of the tube furnace. The tube furnace was also equipped with a vacuum gauge (a Baratron® Direct Pressure/Vacuum Capacitance Manometer commercially available from MKS Instruments, Inc. of Andover, MA) and the pressure in the system was monitored to confirm there was no leakage when the valves were closed. With the valves closed, pressure in the tube furnace was reduced to 2.0 kPa and maintained for a period of about 6.0 hours.

While under vacuum of less than 2.0 kPa, the temperature of the tube furnace was raised to a drying temperature of about 1060° C. A soot compact positioned in the tube furnace was dried by flowing into the furnace a volume of $SiF_4$ sufficient to raise the pressure in the tube furnace to a predetermined target doping pressure, closing the valves and maintaining the closed system condition for a period of between about 15 minutes and about 30 minutes. The volume of $SiF_4$ at standard temperature and pressure ($V_{SiF4\ STP}$) was determined using $V_{SiF4\ STP} = (P_{dope} * V_{tube}) * (273/T_{dry})$ where $P_{dope}$ is the predetermined target doping pressure, $V_{tube}$ is the volume of the tube furnace, and $T_{dry}$ is the drying temperature. The $SiF_4$ was absorbed on the surface of the soot compact and reacted with SiOH on the surface of the soot compact to form HF as a by-product in the closed system. Generally, the pressure in the tube furnace dropped as the absorption of $SiF_4$ was greater than the formation of HF. Once the pressure stabilized, the tube furnace was evacuated and then the valves were closed. While maintaining the vacuum of less than 2.0 kPa, the temperature in the hot zone of the tube furnace was raised to a temperature of about 1100° C. A doping process was initiated by flowing $SiF_4$ into the tube furnace until a doping pressure of 0.25 kPa was reached. As expected, the pressure in the tube furnace dropped as $SiF_4$ was absorbed by the soot compact, and the target doping pressure was maintained by opening the valve coupled to the source of $SiF_4$ and flowing more $SiF_4$ into the tube furnace. The pressure in the tube furnace was maintained at between about 24 kPa and about 25 kPa throughout the doping process. The doping process continued until the pressure in the tube furnace stabilized. Once the pressure in the tube furnace stabilized, the temperature of the tube furnace was raised to a sintering temperature of about 1300° C. to complete the formation of a dense glass article. The glass article was determined to have a fluorine content of about 1.5 wt. %.

Example 5

A similar process as described in Example 4 was utilized to illustrate that a soot compact can be doped with high levels of chlorine with high doping efficiency. In this example, a doping temperature of about 1060° C. and a doping pressure of about 101 kPa were selected to form a doped glass article having a chlorine content of greater than about 2.0 wt. %. The closed system was the same as the closed system of Example 4, except that the closed system includes a 3.5 inch diameter silica tube. The closed system was placed in fluid communication with a vaporizer including a stainless steel vessel containing $SiCl_4$. The stainless steel vessel was immersed in an oil bath set at greater than about 57° C. in order to supply pure $SiCl_4$ gas at a pressure of about 101 kPa. A supply of either pure nitrogen or a combination of 2.0 wt. % $Cl_2$ with a balance of nitrogen gas was fixtured outside the closed system.

A 140 gram silica soot compact was positioned in the center of a hot zone of the closed system. The pressure in the tube furnace was reduced to 2.0 kPa and, while under vacuum, the temperature of the furnace was raised to a drying temperature of about 1060° C. The soot compact was dried by flowing about 1.0 slpm of 2.0 wt. % $Cl_2$ in nitrogen for about 30 minutes through the tube furnace, with both of the valves opened. After drying, the tube furnace was evacuated and then both the valves were closed. While maintaining the vacuum of less than 2.0 kPa, the temperature in the hot zone of the tube furnace was raised to a temperature of about 1060° C. The doping process was initiated by releasing the $SiCl_4$ at about 57° C. to equilibrate into the system volume. As the closed system includes a gas pressure of $SiCl_4$ that is in equilibrium with the liquid source at the normal boiling point of $SiCl_4$, a pressure of 101 kPa was maintained during the doping process which was performed for about 30 minutes. After the doping process was completed the temperature of the furnace was raised to a sintering temperature of about 1400° C. to complete the formation of a dense glass article. Using X-ray fluorescence, the glass article was determined to have a chlorine content of be about 2.2 wt. %.

Optionally, to increase the material use efficiency of the process, the $SiCl_4$ remaining in the closed system may be condensed back into the stainless steel vessel for re-use in subsequent processes. After formation of the dense glass article, the furnace was allowed to cool while the stainless steel vessel was simultaneously cooled to 0° C. in an ice bath. During this cooling period, $SiCl_4$ was transported back into the stainless steel vessel. The furnace was then purged of any residual low level gas using a scrubber. Performing a doping process in closed systems such as described herein was observed to utilize or conserve greater than about 90% of the dopant gas. While the doping efficiency described in this example relates to a doping process using chlorine, it should be understood that the increased doping efficiencies described herein also relate to doping processes using other dopant containing gases.

Example 6

A similar process as described in Example 5 was utilized to illustrate doping a soot compact with even high levels of chlorine while maintaining high doping efficiency. In this example, a doping temperature of about 1060° C. and a doping pressure of about 101 kPa were selected to form a doped glass article having a chlorine content of greater than about 2.0 wt. %. The closed system was the same as the closed system of Example 4, except that the closed system includes a 3.5 inch diameter silica tube. The closed system was placed in fluid communication with a vaporizer including a stainless steel vessel containing $SiCl_4$. The stainless steel vessel was immersed in an oil bath set at greater than about 80° C. in order to supply pure $SiCl_4$ gas at a pressure of about 180 kPa. A supply of either pure nitrogen or a combination of 2.0 wt. % $Cl_2$ with a balance of nitrogen gas was fixtured outside the closed system.

A 140 gram silica soot compact was positioned in the center of a hot zone of the closed system. The pressure in the tube furnace was reduced to 2.0 kPa and, while under vacuum, the temperature of the furnace was raised to a drying temperature of about 1060° C. The soot compact was dried by flowing about 1.0 slpm of 2.0 wt. % $Cl_2$ in nitrogen for about 30 minutes through the tube furnace, with both of the valves opened. After drying, the tube furnace was evacuated and then both the valves were closed. While maintaining the vacuum of less than 2.0 kPa, the temperature in the hot zone of the tube furnace was raised to a temperature of about 1060° C. The doping process was initiated by releasing the $SiCl_4$ at about 80° C. to equilibrate into the system volume. As the closed system includes a gas pressure of $SiCl_4$ that is in equilibrium with the liquid source at the normal boiling point of $SiCl_4$, a pressure of 180 kPa was maintained during the doping process which was performed for about 30 minutes. After the doping process was completed the temperature of the furnace was raised to a sintering temperature of about 1300° C. to complete the formation of a dense glass article. Using X-ray fluorescence, the glass article was determined to have a chlorine content of be about 2.6 wt. %.

As exemplified, performing the doping process at higher pressures enabled formation of a doped glass article with higher dopant content. Performing the doping process in a closed system such as described herein enabled achieving the higher dopant content.

While the present disclosure has been described with respect to a limited number of embodiments, those skilled in the art, having benefit of this disclosure, will appreciate that other embodiments can be devised which do not depart from the scope of the invention as disclosed herein. Accordingly, the scope of the present disclosure should be limited only by the attached claims.

What is claimed is:

1. A method of forming an optical element, the method comprising:
   producing silica-based soot particles using chemical vapor deposition, the silica-based soot particles having an average particle size between about 0.05 microns and about 0.25 microns and a particulate surface area greater than about 20 $m^2$/g, and the silica-based soot particles having a titania content from about 1.0 wt. % to about 14 wt. %;
   pressing the silica-based soot particles with a pressing mechanism to form a soot compact from the silica-based soot particles, the pressing mechanism asserting a pressure on the silica-based soot particles of less than about 1000 psi, the soot compact having a density from about 0.50 g/cc to about 1.20 g/cc;
   doping the soot compact with a halogen in a closed system to form a doped soot compact, the doped soot compact comprising the halogen,
      wherein, during the doping of the soot compact with the halogen, maintaining a total pressure in the closed system of about 0.25 atm or greater;
   consolidating the doped soot compact by simultaneously increasing the temperature of the doped soot compact and decreasing a concentration of a dopant containing gas in the closed system, while still actively flowing the dopant containing gas in the closed system, to form a glass article; and
   annealing the glass article to form the optical element,
      wherein the optical element has a slope of coefficient of thermal expansion versus temperature at 20° C. of less than about 1.0 ppb/$K^2$.

2. The method of claim 1, wherein the total pressure in the closed system is between about 0.25 atm and about 2.0 atm.

3. The method of claim 1, wherein the slope of coefficient of thermal expansion versus temperature at 20° C. is less than about 0.80 ppb/$K^2$.

4. The method of claim 3, wherein the slope of coefficient of thermal expansion versus temperature at 20° C. is less than about 0.60 ppb/$K^2$.

5. The method of claim 1, wherein the halogen is fluorine.

6. The method of claim 1, wherein the halogen is chlorine.

7. The method of claim 1, wherein doping the soot compact with the halogen in the closed system comprises contacting the soot compact with the dopant containing gas, a partial pressure of the dopant containing gas in the closed system being between about 0.10 atm and about 0.90 atm.

8. The method of claim 1, wherein doping the soot compact with the halogen comprises contacting the soot compact with the dopant containing gas in the closed system at a temperature of less than about 1200° C.

9. The method of claim 1, wherein the silica-based soot particles have a surface area of greater than about 50 $m^2$/gram.

10. The method of claim 1, wherein the pressing mechanism asserts a pressure of less than about 250 psi on the silica-based soot particles.

11. The method of claim 1, wherein the pressing mechanism comprises a pressing plate that asserts pressure on the silica-based soot particles in an axial direction.

* * * * *